United States Patent
Park (10) Patent No.: US 9,418,805 B2
(45) Date of Patent: Aug. 16, 2016

(54) TERMINAL STRUCTURE OF MAIN CIRCUIT PART OF VACUUM CIRCUIT BREAKER

(71) Applicant: LSIS CO., LTD., Anyang-si, Gyeonggi-do (KR)

(72) Inventor: Woo Jin Park, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/490,310

(22) Filed: Sep. 18, 2014

(65) Prior Publication Data
US 2015/0179375 A1    Jun. 25, 2015

(30) Foreign Application Priority Data
Dec. 20, 2013    (KR) .......................... 10-2013-0160479

(51) Int. Cl.
*H01H 33/66*    (2006.01)
*H02B 11/04*    (2006.01)

(52) U.S. Cl.
CPC ............ *H01H 33/6606* (2013.01); *H02B 11/04* (2013.01); *H01H 2033/6613* (2013.01)

(58) Field of Classification Search
CPC .............. H01H 2033/6613; H01H 2033/6665; H01H 33/6606; H01H 33/66; H02B 1/56; H02B 11/04; H02B 11/12
USPC ........... 218/118, 123, 121, 140, 153, 154, 10, 218/11; 361/676, 611; 335/27
See application file for complete search history.

(56) References Cited

U.S. PATENT DOCUMENTS

| | | | | |
|---|---|---|---|---|
| 4,005,297 A | * | 1/1977 | Cleaveland | F28D 15/02 165/104.26 |
| 5,753,875 A | * | 5/1998 | Benke | H01H 9/52 218/118 |
| 5,929,410 A | * | 7/1999 | Mun | H01H 1/62 218/121 |
| 2010/0282713 A1 | * | 11/2010 | Tu | H01H 33/6606 218/118 |

FOREIGN PATENT DOCUMENTS

| | | |
|---|---|---|
| CN | 1474486 | 2/2004 |
| CN | 100386834 | 5/2008 |

(Continued)

OTHER PUBLICATIONS

Machine translation of KR100950129 (Orig. doc. published Aug. 10, 2009).*

(Continued)

*Primary Examiner* — Renee Luebke
*Assistant Examiner* — William Bolton
(74) *Attorney, Agent, or Firm* — Lee, Hong, Degerman, Kang & Waimey PC; Jonathan Kang; Justin Lee (57) ABSTRACT

A terminal structure of main circuit part of vacuum circuit breaker includes a cylindrical terminal having a circular heat fin unit at its inner surface and an air-flow path formed perpendicular to each other at upper and lower portion thereof and a bar type terminal heat diffusion fins at upper, lower and side surfaces thereof to facilitate heat discharging generated at an inner space of the main circuit of the vacuum circuit breaker.

7 Claims, 11 Drawing Sheets

(56) References Cited

FOREIGN PATENT DOCUMENTS

| | | |
|---|---|---|
| CN | 102017039 | 4/2011 |
| DE | 20121796 | 5/2003 |
| JP | 10-322819 | 12/1998 |
| JP | 2004-072914 | 3/2004 |
| JP | 2006-166651 | 6/2006 |
| JP | 2009-081081 | 4/2009 |
| JP | 2009-277386 | 11/2009 |
| KR | 10-2006-0065437 | 6/2006 |
| KR | 10-2009-0085975 | 8/2009 |
| KR | 10-0950129 | 3/2010 |

OTHER PUBLICATIONS

European Patent Office Application Serial No. 14188760.4, Search Report dated Apr. 15, 2015, 4 pages.

Korean Intellectual Property Office Application Serial No. 10-2013-0160479, Office Action dated Jan. 29, 2015, 4 pages.

Japan Patent Office Application Serial No. 2014-206138, Office Action dated Sep. 1, 2015, 2 pages.

The State Intellectual Property Office of the People's Republic of China Application No. 201410710253.8, Office Action dated May 31, 2016, 6 pages.

* cited by examiner

FIG. 1

PRIOR ART

FIG. 2

PRIOR ART

FIG. 3

PRIOR ART

TERMINAL STRUCTURE OF MAIN CIRCUIT PART OF VACUUM CIRCUIT BREAKER

CROSS-REFERENCE TO RELATED APPLICATION

Pursuant to 35 U.S.C. §119(a), this application claims the benefit of earlier filing date and right of priority to Korean Application No. 10-2013-0160479, filed on Dec. 20, 2013, the contents of which are all hereby incorporated by reference herein in its entirety.

BACKGROUND OF THE INVENTION

1. Field of the Invention

The present invention relates to a main circuit part of a vacuum circuit breaker, and more particularly, to a terminal structure of a main circuit part of a vacuum circuit breaker.

2. Description of the Conventional Art

In general, a vacuum circuit breaker is a circuit breaker installed in a high voltage electric power system to break a circuit to protect the electric power system in the event of a dangerous situation such as a short circuit or an overcurrent, and it is designed by utilizing excellent insulating performance and arc-extinguishing capability in a vacuum state.

The vacuum circuit breaker is categorized into a drawable type vacuum circuit breaker and a fixed type vacuum circuit breaker. That is, the vacuum circuit breaker is divided into a fixed type circuit breaker which consists only of a main body and is fixed to a switch panel, and a drawable type circuit breaker which is configured to have an outer box called a cradle for facilitating the maintenance and repair of the circuit breaker so that a main body is retracted into or pulled out of the cradle.

Figure 1:
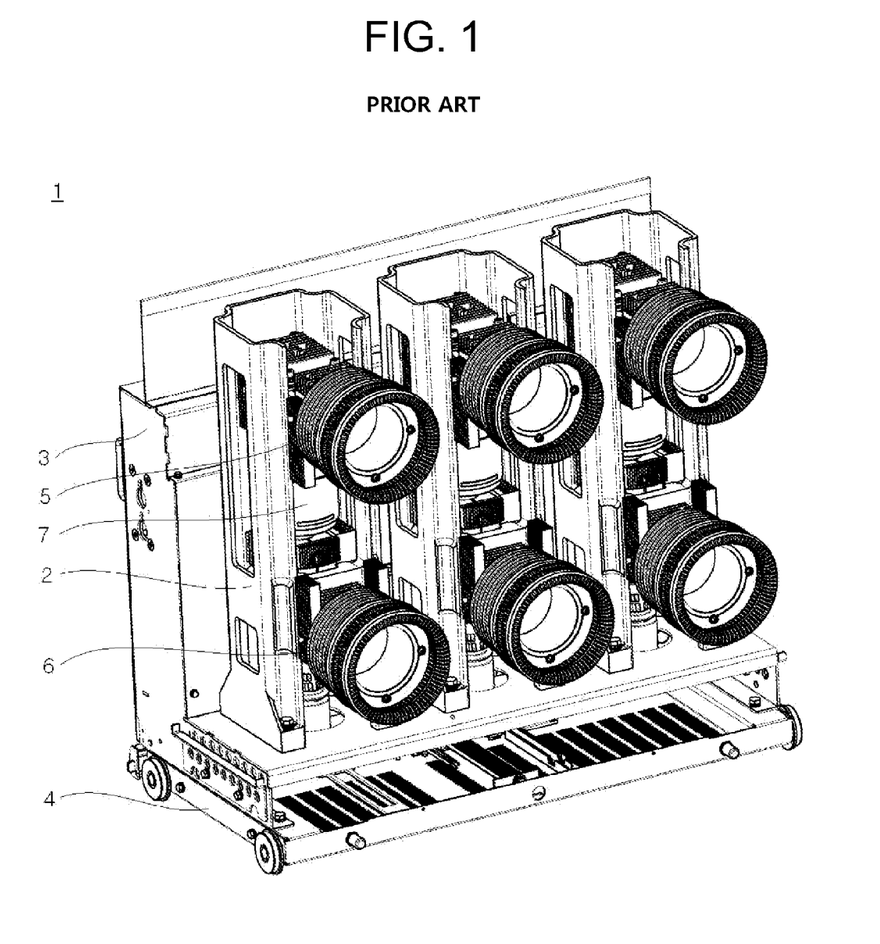
FIG. 1 illustrates a circuit breaker in accordance with the conventional art.

FIG. 1 illustrates a main body of a drawable type vacuum circuit breaker according to the conventional art. As shown in FIG. 1, the main body 1 of the vacuum circuit breaker includes a main circuit part 2, a manipulation part 3, and a feeding part 4. Among these parts, the main circuit part 2 is an essential one which is operated to apply or break a current and a voltage in the circuit system, and includes an upper terminal 5 connected to a power supply and a lower terminal 6 connected to a load.

Figure 2:
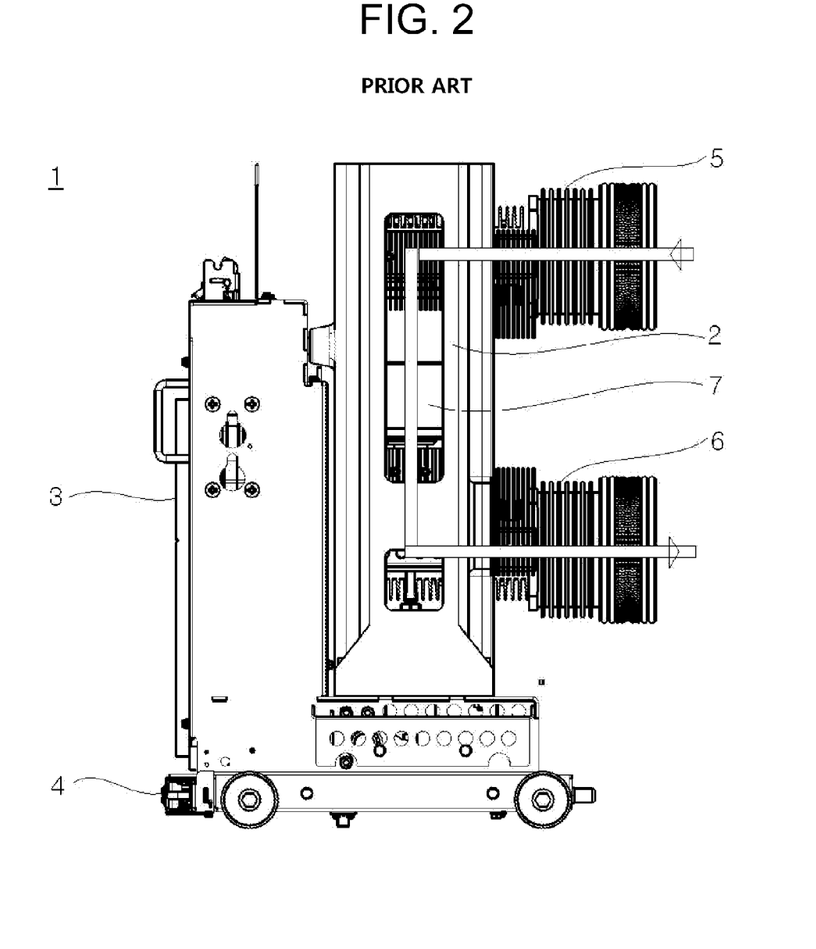
FIG. 2 is a view illustrating a current flow in a circuit breaker in accordance with the conventional art.

FIG. 2 illustrates a current flow of a conventional vacuum circuit breaker.

Referring to FIG. 2, a current applied from a power supply flows into a load via the upper terminal 5, a vacuum interrupter 7, and the lower terminal 6, sequentially.

Figure 3:
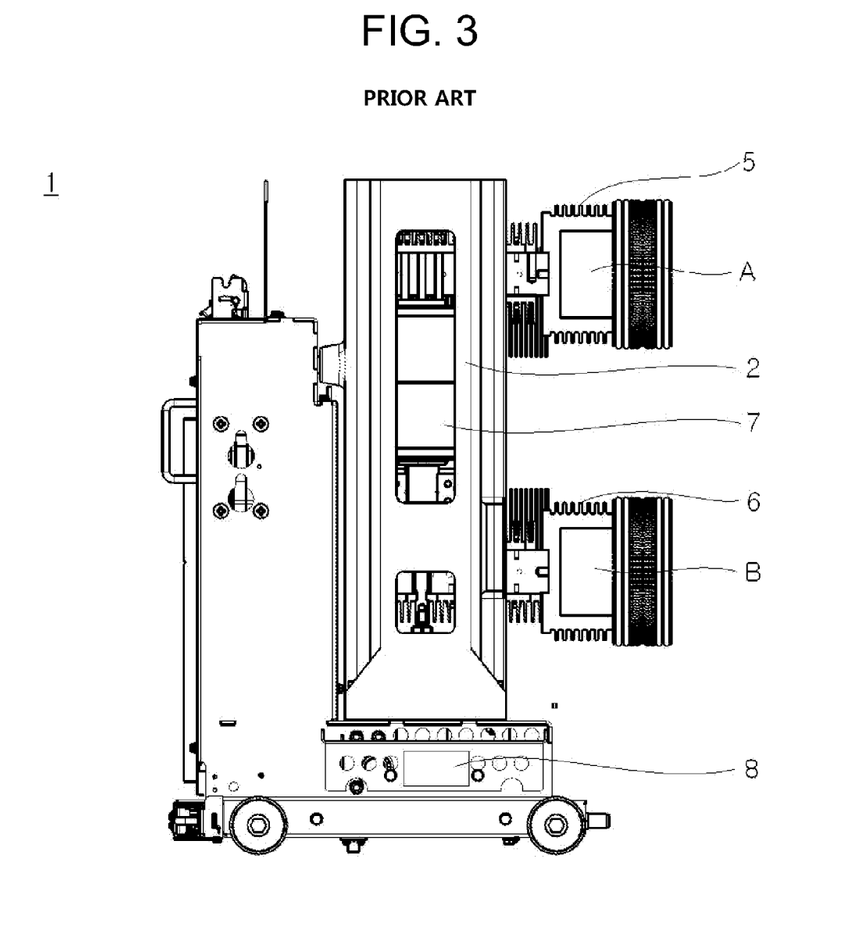
FIG. 3 is a side view illustrating an inner state of a terminal structure of a main circuit part shown in FIG. 2.

In such a conventional vacuum circuit breaker, the upper terminal 5 and the lower terminal 6 of the main circuit part 2 are made of copper. As the current carrying capability of the circuit becomes larger, the cross-sectional area of the upper and lower terminals 5 and 6 becomes larger in proportion thereto. However, as the copper has a relatively high weight due to its high density, the upper and lower terminals 5 and 6 of the large-capacity vacuum circuit breaker are configured as a hollow type so as to have a minimum weight, while maintaining a minimum sectional area for current application. Thus, when the vacuum circuit breaker is operated in an inserted state into a cradle (not shown), closed spaces A and B are formed in the upper and lower terminals 5 and 6, as shown in FIG. 3, resulting in high-temperature air within the closed spaces A and B. This may cause the temperature of the upper and lower terminals 5 and 6 to rise. To overcome such a problem, there has been provided a compulsory device such as a cooling fan (cooler 8) or the size of the terminals 5 and 6 had to be much more increased.

However, there have been some problems in that as the size of the terminals 5 and 6 becomes larger, the material cost becomes high and the installation area also becomes large. Further, in a case where the compulsory cooling device is provided, the internal design of the vacuum circuit breaker becomes complicated, the number of components is increased, and the power consumption is increased.

Meanwhile, Korean Patent No. 10-0950129 (Title: Main Circuit Terminal Assembly of Vacuum Circuit Breaker) may be referred to as a prior art of the present invention.

SUMMARY OF THE INVENTION

Therefore, an object of the present invention is to provide a terminal structure of a main circuit part of a vacuum circuit breaker, which is capable of efficiently discharging heat generated from the main circuit part of the vacuum circuit breaker, thereby preventing a temperature rise in the main circuit part of the high-pressure vacuum circuit breaker.

To achieve these and other advantages and in accordance with the purpose of this specification, as embodied and broadly described herein, there is provided a terminal structure of a main circuit part of a vacuum circuit breaker, including a cylindrical terminal having a circular heat fin unit at its inner surface and an air-flow path formed at upper and lower portions thereof in a direction perpendicular to a ground surface; and bar type terminal having a plurality of fin blades at an upper surface, a lower surface and side surfaces thereof.

The air-flow path may include an upper aperture formed at an upper side of the cylindrical terminal and a lower aperture formed at a lower side of the cylindrical terminal.

The upper aperture and the lower aperture may be formed to be symmetrical to each other.

The upper aperture and the lower aperture may be formed to extend toward an inner surface of the cylindrical terminal.

An outer diameter of the circular heat fin unit may be smaller than an inner diameter of the cylindrical terminal.

The circular heat fin unit may be located at the air-flow path.

The circular heat fin unit may be provided in a lengthwise direction of the air-flow path.

The present invention can have the following advantages. Firstly, as an air-flow path is formed within a closed space of a terminal of a main circuit part for air circulation with outside, a temperature rise in the terminal can be reduced.

Further, the circular heat fin unit provided on the inner surface of the cylindrical terminal is located at the air-flow path, heat diffusion efficiency can be increased.

Thus, a compact-sized terminal structure of a main circuit part can be implemented.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a preferred embodiment of the present invention will be described in detail with reference to the accompanying drawings.

A terminal structure of a main circuit part of a vacuum circuit breaker according to an embodiment of the present invention includes a cylindrical terminal having an air-flow path and a bar type terminal having a plurality of fin blades at its front surface.

Figure 4:
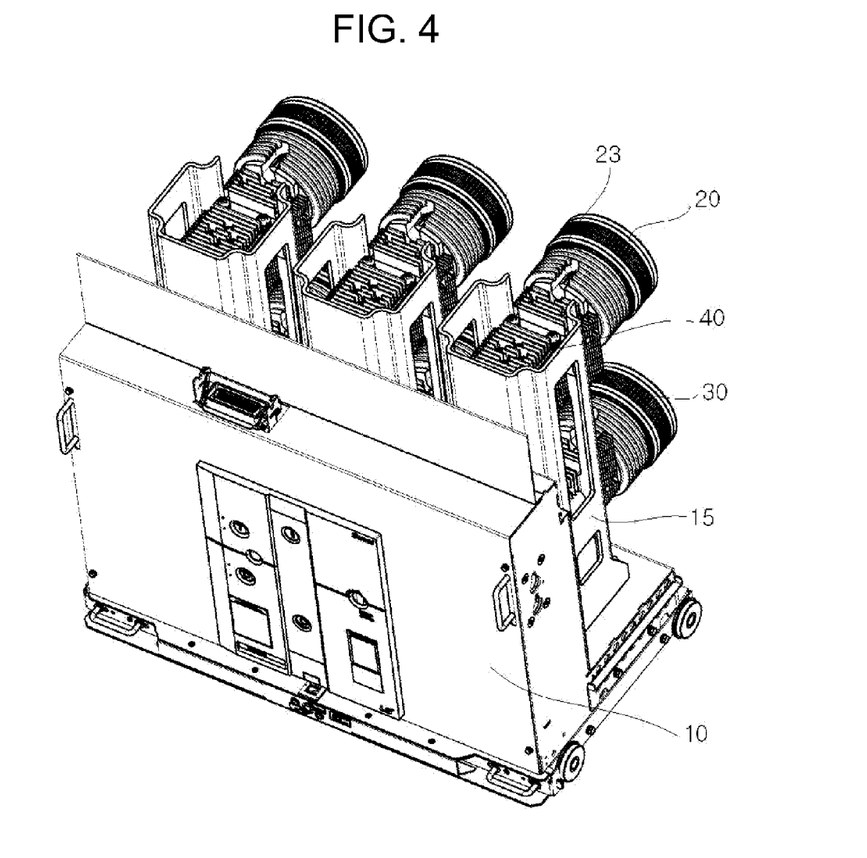
FIG. 4 is a front perspective view of a terminal structure of a main circuit part of a vacuum circuit breaker according to an embodiment of the present invention.
Figure 5:
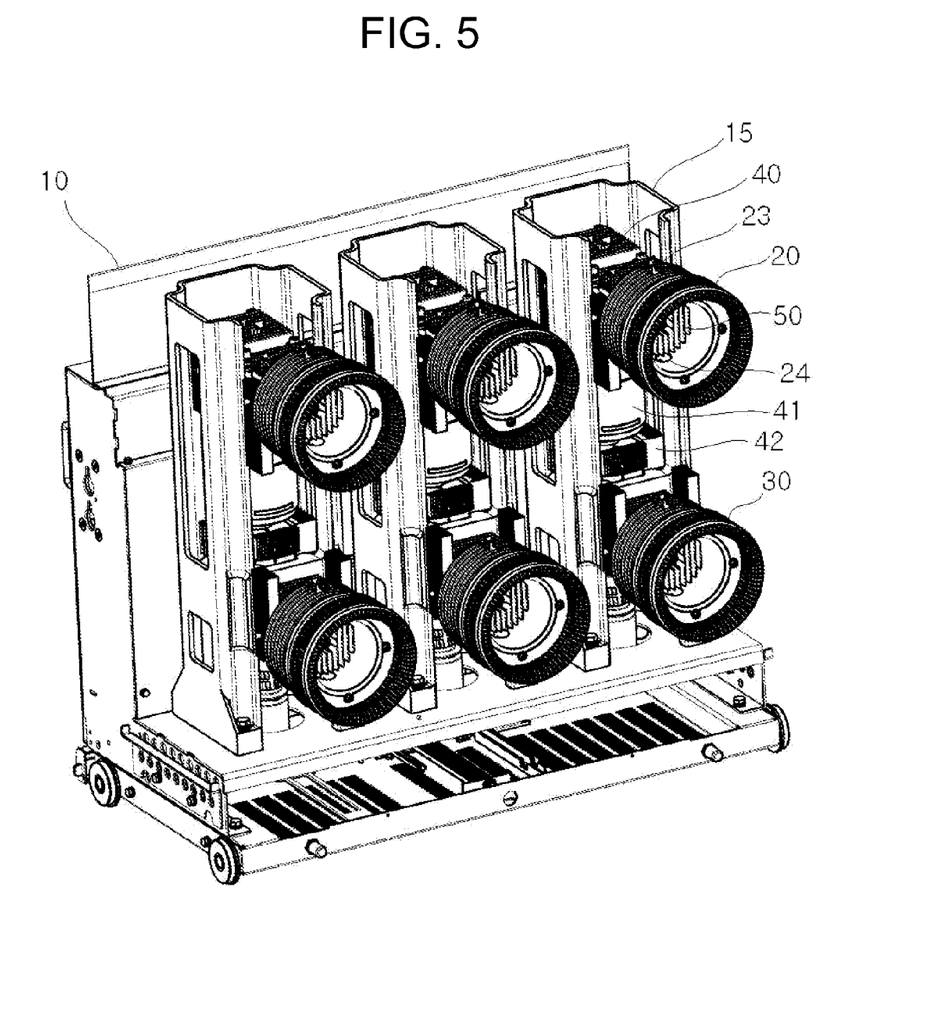
FIG. 5 is a rear perspective view of a terminal structure of a main circuit part of a vacuum circuit breaker according to an embodiment of the present invention.
Figure 6A:
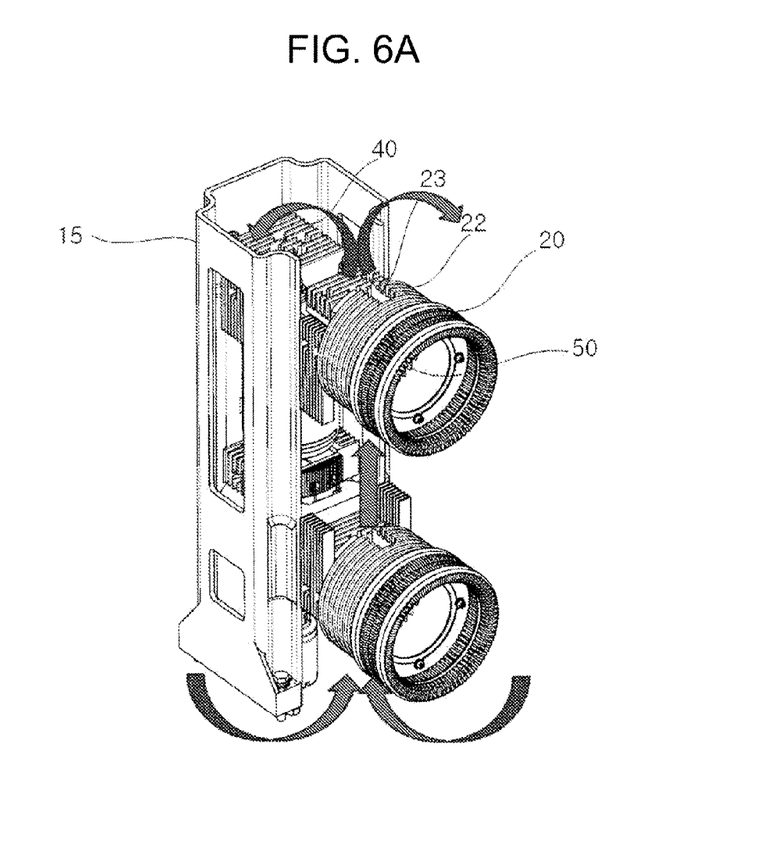
FIGS. 6A and 6B are a perspective view and a planar view of a terminal structure of a main circuit part of a vacuum circuit breaker according to an embodiment of the present invention, respectively.
Figure 6B:
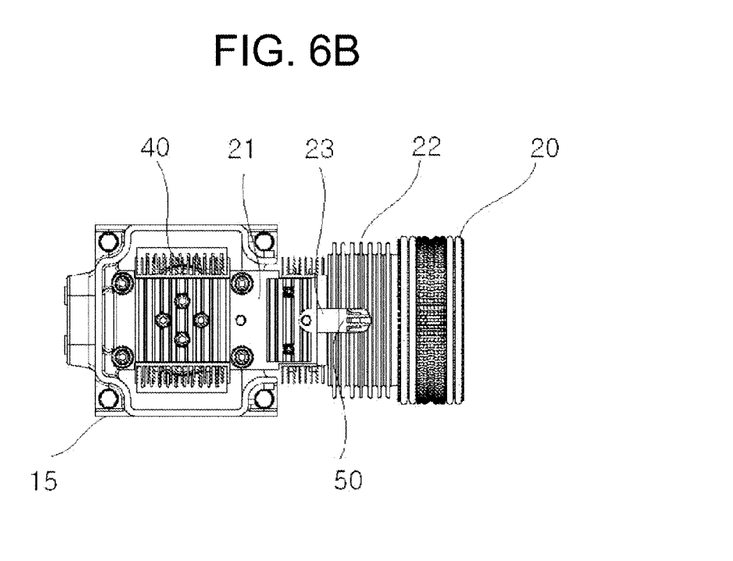
Figure 7:
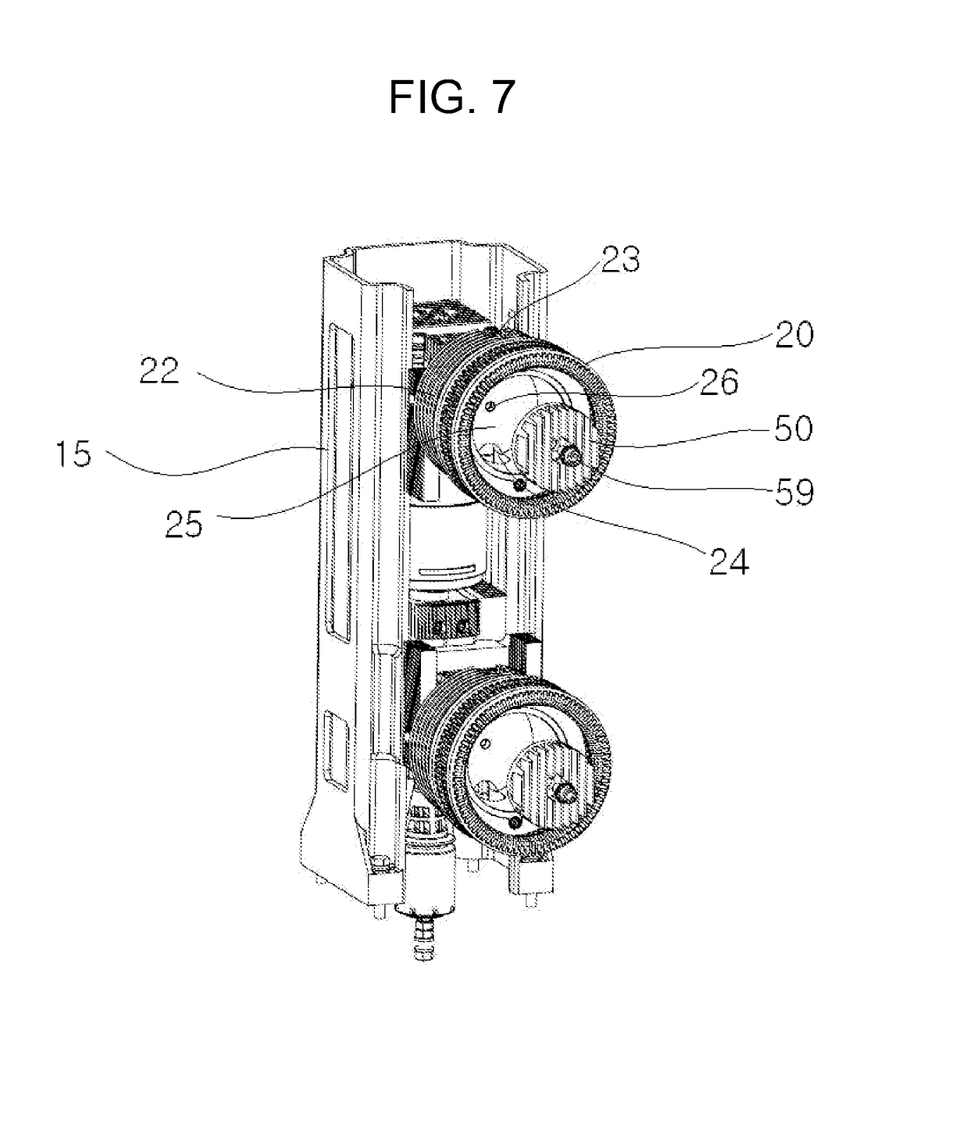
FIG. 7 is a perspective view of a terminal structure of a main circuit part of a vacuum circuit breaker from which a heat diffusion fin unit is separated.
Figure 8A:
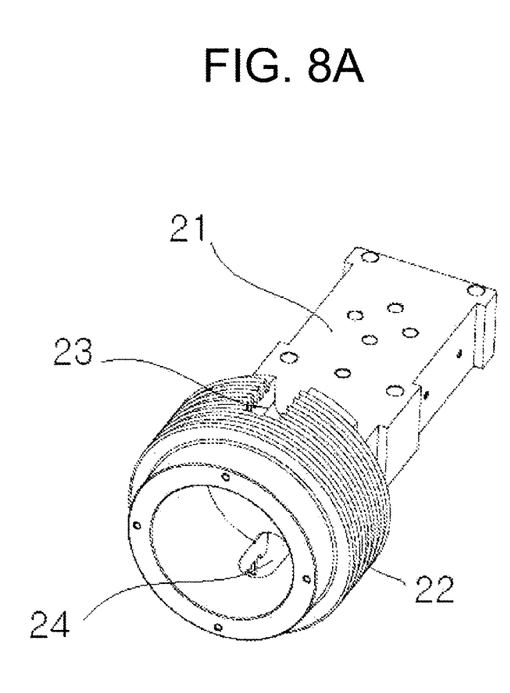
FIGS. 8A to 8C are a perspective view, a planar view and a front view illustrating a terminal structure of the present invention.
Figure 8B:
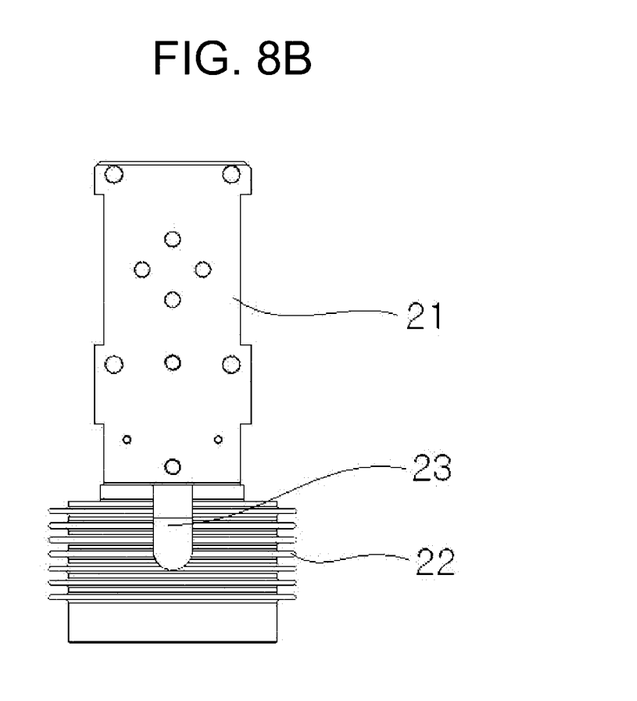
Figure 8C:
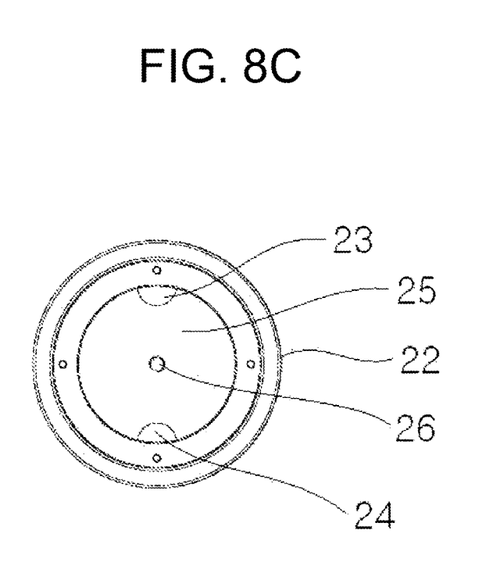

FIG. 4 is a front perspective view of a terminal structure of a main circuit part of a vacuum circuit breaker according to an embodiment of the present invention; FIG. 5 is a rear perspective view of a terminal structure of a main circuit part of a vacuum circuit breaker according to an embodiment of the present invention; FIGS. 6A and 6B are a perspective view and a planar view of a terminal structure of a main circuit part of a vacuum circuit breaker according to an embodiment of the present invention, respectively; FIG. 7 is a perspective view of a terminal structure of a main circuit part of a vacuum circuit breaker from which a heat diffusion fin unit is separated; and FIGS. 8A to 8C are a perspective view, a planar view and a front view illustrating a terminal structure of the present invention.

Referring to FIGS. 4 through 8C, a terminal structure of a main circuit part of a vacuum circuit breaker according to an embodiment of the present invention will now be explained in detail.

As shown in FIGS. 4 and 5, a main body 10 is provided. A main circuit part 15 of the main body 10 includes an upper terminal 20 and a lower terminal 30 which are provided to protrude outwardly. Each of the upper and lower terminals 20 and 30 is provided with a plurality of heat diffusion fins 40 to efficiently discharge heat generated by a large current flowing therethrough. In viewing a basic current flow, a current applied from a power supply flows into the lower terminal 30 through the upper terminal 20 and a vacuum interrupter 41, sequentially. Then, the current is applied to a load. Between the vacuum interrupter 41 and the lower terminal 30, a flexible shunt 42 may be provided in order to provide a gap for allowing a flexible movement of a movable unit of the vacuum interrupter 41.

The main circuit part 15 is generally provided at the main body 10 for three-phases(R-S-T). As the three phases are formed and operated in the same manner, a main circuit part of only a single phase will now be described.

The upper terminal 20 includes a bar type terminal 21 and a cylindrical terminal 22. The bar type terminal 21 is formed in a box type, and coupled to an upper portion of a fixed electrode of the vacuum interrupter 41. A plurality of heat fins 40 are provided at an upper surface, a lower surface and side surfaces of the bar type terminal 21 to discharge heat generated while a current flows. The bar type terminal 21 and the cylindrical terminal 22 may be coupled to each other by means of a brazing welding.

The cylindrical terminal 22 is formed in an approximately cup-shape. A part of a closed space inside the cylindrical terminal 22 is open to provide an air-flow path for air circulation with the exterior. As an embodiment of the air-flow path, an upper aperture 23 and a lower aperture 24 are formed at an upper portion and a lower portion of the cylindrical terminal 22, respectively. By virtue of the upper and lower apertures 23 and 24, an air-flow path through which air flows from a lower part of the upper terminal 20 to an upper part of the upper terminal 20, may be formed. And a natural convection of air may occur through the air-flow path. That is, cold air at a lower part of the cylindrical terminal 22 flows into an inner space of the cylindrical terminal 22 through the lower aperture 24, and hot air in the inner space of the cylindrical terminal 22 is discharged out through the upper aperture 23. Under such a configuration, heat within the cylindrical terminal 22 may be discharged out. Since the upper and lower apertures 23 and 24 are formed at the upper and lower portions of the cylindrical terminal 22, respectively, the air-flow path may be formed to be perpendicular to a ground surface to thus utilize a natural convection.

The upper and lower apertures 23 and 24 may be formed symmetrical to each other at the upper and lower portions of the cylindrical terminal 22.

Further, the upper and lower apertures 23 and 24 may be formed to extend to an inner surface 25 of the cylindrical terminal 22. As the upper and lower apertures 23 and 24 may be formed to extend to the inner surface 25 of the cylindrical terminal 22, an inflow of external air through the lower aperture 24 and a discharge of internal air through the upper aperture 23 may be efficiently performed.

A circular heat fin unit 50 having a plurality of fin blades at its front surface is coupled to the inner surface 25 of the cylindrical terminal 22. To couple the circular heat fin unit 50 to the inner surface 25 of the cylindrical terminal 22, a coupling hole 26 may be formed at the inner surface 25. The circular heat fin unit 50 may be coupled by a coupling means such as a screw 59. Although not shown in the drawings, an additional means such as a mounting recess may be formed within the inner surface 25 of the cylindrical terminal 22 in order to facilitate fixture of the circular heat fin unit 50.

The circular heat fin unit 50 can be easily inserted into the cylindrical terminal 22, due to a circular shape thereof. An outer diameter of the circular heat fin unit 50 is smaller than an inner diameter of the cylindrical terminal 22. Assuming that an outer diameter of the circular heat fin unit 50 is 'D' and an inner diameter of the cylindrical terminal 22 is 'd', a relation between the outer diameter 'D' of the circular heat fin unit 50 and the inner diameter 'd' of the cylindrical terminal 22 may be D<4/5d. A more precise value may be obtained through hydrodynamics experiments. Under such a configuration, a gap is formed between the upper and lower apertures 23 and 24 and the circular heat fin unit 50, so that air circulation can be smoothly performed.

Preferably, the circular heat fin unit 50 may be located at the air-flow path. The circular heat fin unit 50 may be exposed to air flowing through the air-flow path, thereby efficiently performing a heat diffusion.

Further, fin blades of the circular heat fin unit 50 may be provided in a lengthwise direction of the air-flow path to minimize resistance to an air flow.

With respect to the lower terminal 30, the air-flow path and the circular heat fin unit 50 may be provided in the same manner as the upper terminal 20.

Further, as the circular heat fin unit 50 is mounted within the cylindrical terminal 22, lowering of an insulation efficiency can be prevented.

As described above, the upper and lower terminal structure of the present invention may easily discharge heat therewithin and reduce temperature rise due to a current flow so that a small and compact sized vacuum circuit breaker may be obtained.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal structure of a main circuit part of a vacuum circuit breaker, the terminal structure of the main circuit part comprising:
   a cylindrical terminal comprising a circular heat fin unit at an inner surface of the cylindrical terminal and an air-flow path from a lower side of the cylindrical terminal to an upper side of the cylindrical terminal in a first direction perpendicular to a length-wise center axis of the cylindrical terminal; and
   a bar terminal and heat diffusion fins provided at an upper surface, a lower surface, and side surfaces of the bar terminal;
   wherein the circular heat fin unit is located at the air-flow path and comprises a plurality of heat fins aligned parallel to the first direction.

2. The terminal structure of claim 1, wherein the air-flow path is between:
   an upper aperture formed at the upper side of the cylindrical terminal; and
   a lower aperture formed at the lower side of the cylindrical terminal.

3. The terminal structure of claim 2, wherein the upper aperture and the lower aperture are formed to be symmetrical to each other.

4. The terminal structure of claim 2, wherein the upper aperture and the lower aperture are formed to extend toward the inner surface of the cylindrical terminal.

5. The terminal structure of claim 2, wherein the air-flow path corresponds to a diameter of a cross-sectional circle of the cylindrical terminal.

6. The terminal structure of claim 1, wherein an outer diameter of the circular heat fin unit is smaller than an inner diameter of the cylindrical terminal.

7. The terminal structure of claim 1, wherein the circular heat fin unit is coupled to a base of the cylindrical terminal.

* * * * *